United States Patent [19]

Wiseman, Jr.

[11] Patent Number: 5,002,128
[45] Date of Patent: Mar. 26, 1991

[54] WELL TREATING METHOD

[76] Inventor: Ben W. Wiseman, Jr., P.O. Box 10484, Midland, Tex. 79702

[21] Appl. No.: 422,632

[22] Filed: Oct. 17, 1989

[51] Int. Cl.$^5$ .................. E21B 43/27; E21B 41/02
[52] U.S. Cl. .................................... 166/307; 166/902
[58] Field of Search .................. 166/307, 305.1, 311, 166/312, 271, 902

[56] References Cited

U.S. PATENT DOCUMENTS

| | | | |
|---|---|---|---|
| 2,675,083 | 4/1954 | Bond et al. | 166/307 X |
| 2,850,098 | 9/1958 | Moll et al. | 166/307 |
| 3,100,528 | 8/1963 | Plummer et al. | 166/307 X |
| 3,354,957 | 11/1967 | Every et al. | 166/307 X |
| 3,398,791 | 8/1968 | Hurd | 166/270 |
| 3,507,747 | 4/1970 | Vogt, Jr. et al. | 166/307 |
| 3,722,594 | 3/1973 | Smith et al. | 166/307 X |
| 3,915,233 | 10/1975 | Slusser | 166/307 |
| 3,929,192 | 12/1975 | Friedman | 166/307 X |
| 3,938,593 | 2/1976 | Friedman | 166/307 |
| 4,250,965 | 2/1981 | Wiseman, Jr. | 166/307 X |

Primary Examiner—George A. Suchfield
Attorney, Agent, or Firm—Crutsinger & Booth

[57] ABSTRACT

A method of stimulating production of hydrocarbons from a well capable of production from oil and gas bearing strata wherein a desiccant is delivered through the well to dehydrate the well and a zone around it and then an anhydrous carrier for an anhydrous acidizing agent such as hydrogen chloride, hydrogen fluoride, or carbon dioxide is injected at a pressure sufficient for the gaseous materials to permeate through the strata and react with connate water to form a mixture of carbonic, HCl, or HF acids which will react with rocks forming the strata to increase the permeability of the strata and thereby stimulate production from the well.

24 Claims, 3 Drawing Sheets

WELL TREATING METHOD

TECHNICAL FIELD

A well treatment method wherein a tubing string and casing in a well are purged of water prior to delivering anhydrous acids into a formation to react with connate water in a zone around the well to increase the permeability of the strata.

BACKGROUND OF THE INVENTION

The method disclosed herein relates to improvements in the well treating method disclosed in U.S. Pat. No. 4,250,965 which issued Feb. 17, 1981 to Ben W. Wiseman, Jr., the disclosure of which is incorporated herein by reference in its entirety. The Wiseman patent discloses a method of stimulating primary production of a well wherein liquid carbon dioxide evaporated to form anhydrous gaseous carbon dioxide which was delivered to permeate through the strata to react with connate water to make carbonic acid. The well was shut in for a period of time enabling the carbonic acid to react with the rocks in the strata to increase the permeability of the strata and thereby stimulate production of the well.

Corrosive acidizing agents such as hydrofluoric, hydrochloric, acetic, and carbonic acids are often used for stimulating the production from an oil or gas well. Conventionally, these acidizing agents are liquids, which are pumped at high pressure into the well to react with rocks in the oil or gas bearing strata in an attempt to increase the permeability of the strata. When the corrosive acids are being pumped down the production tubing or casing, they react to some degree with the materials used to make the tubing or casing even when an inhibitor is mixed with the acid.

In some cases the formation may be damaged when the liquid is pumped into the formation at high pressure. Clay particles tend to swell and become disassociated from rock in the formation which may reduce permeability. The creation of an oil/water emulsion and the entrapment of water by surface tension also reduce permeability.

Conventional acidizing processes generally require the use of substantial quantities of water and equipment to flush and swab the well to minimize damage to the tubulars in the well. Recovery and disposal of the water to prevent ecological damage is expensive and time consuming. Further, water introduced and left in the formation may damage the reservoir.

A paper entitled "The $CO_2$ Huff 'N Puff Process" by Elmond L. Claridge presented at the "Enhanced Recovery Week Symposium: EOR Using $CO_2$", Dec. 6, 1984, at Houston, Tex., contains a review of several publications which discuss the injection of $CO_2$ into an oil well alternating with production of the same well by a process referred to as "huff and puff." The article indicates that the cylic $CO_2$ injection process lowered viscosity of the mixture of $CO_2$ and crude oil, swelled the crude oil in which $CO_2$ was dissolved, provided a solution-gas drive achieved by dissolving $CO_2$ in the crude oil up to a higher saturation pressure followed by lower pressures during production, and vaporization of components into $CO_2$ with recovery of light crude oil components from produced $CO_2$.

Burnett Pat. No. 3,841,406 discloses a method of recovering oil from an oil-bearing formation in which a gas having a limited solubility in oil is injected into the formation via a well, to increase the formation pressure, and thereafter a slug of carbon dioxide is injected via the same well. Following injection of the carbon dioxide, the well was shut in for a period of one to three days to permit the carbon dioxide to become dissolved in the oil to establish in the vicinity of the well bore a zone of oil saturated with carbon dioxide, so as to reduce the viscosity of the oil within a radial distance of about 20 to 100 feet from the well.

The technique of forming acids in situ with the oil or gas bearing strata in secondary and tertiary production wells in flooding projects are well known. Some examples of these techniques are described in U.S. Pat. Nos. 2,011,357; 3,072,185; 3,091,292; 3,259,187; 3,344,858; 3,353,579; 3,392,782; 3,398,791; 4,250,965 and 3,532,165.

The method disclosed in the patent to Wiseman significantly stimulates production. However, in certain well treatment processes it appears that the use of an acid which is stronger than carbonic acid is needed to further increase the permeability of the strata without subjecting the tubing string and casing to highly corrosive acidizing agents and attendant potentially ecologically damaging results of conventional acidizing processes.

SUMMARY OF THE INVENTION

It is the primary object of the present invention to inject carbon dioxide, nitrogen, or other gases as a carrier for strong anhydrous acids down the bore of an oil or gas well to form carbonic, hydrochloric and hydrofluoric acids with the connate water in the strata. The acids react with the rocks in the strata to increase the permeability, but the likelihood of damage to the production tubing or casing of the well is significantly reduced because non-reactive anhydrous acid is pumped therethrough after a desiccant has been used to remove moisture from surfaces in and around the well.

Injecting the $CO_2$ additionally as a carrier for other anhydrous acids down the bore of an oil or gas well forms carbonic, hydrochloric and hydrofluoric acids downhole in the strata which then reacts with rocks in the strata to thereby increase permeability of the strata.

In accordance with the invention, a method of stimulating production of hydrocarbons from a well includes the steps of injecting a predetermined volume of desiccant down the tubulars to assure water-free passage out of the well bore of an anhydrous acid. An anhydrous acid is mixed with an anhydrous carrier, such as carbon dioxide, and delivered down the well bore such that the anhydrous carrier along with the anhydrous acid are in a gaseous fluid state that has neither independent shape nor volume to cause the anhydrous gaseous acid to permeate through the strata and react with connate water to make carbonic acid, if $CO_2$ is used as the carrier, along with HCl and HF in the strata away from the well bore.

The well is then shut in for a period of time sufficient for the acids to fully react with rocks in the strata, thereby increasing the permeability of the strata to stimulate production from the oil or gas well and assuring that the acid is substantially spent before it contacts the tubing or casing as it is recovered.

BRIEF DESCRIPTION OF THE DRAWINGS

Drawings of a preferred embodiment of the invention are annexed hereto so that the invention may be better and more fully understood, in which.

Numeral references are employed to designate like parts throughout the various figures of the drawings.

DETAILED DESCRIPTION OF THE INVENTION

Figure 1:
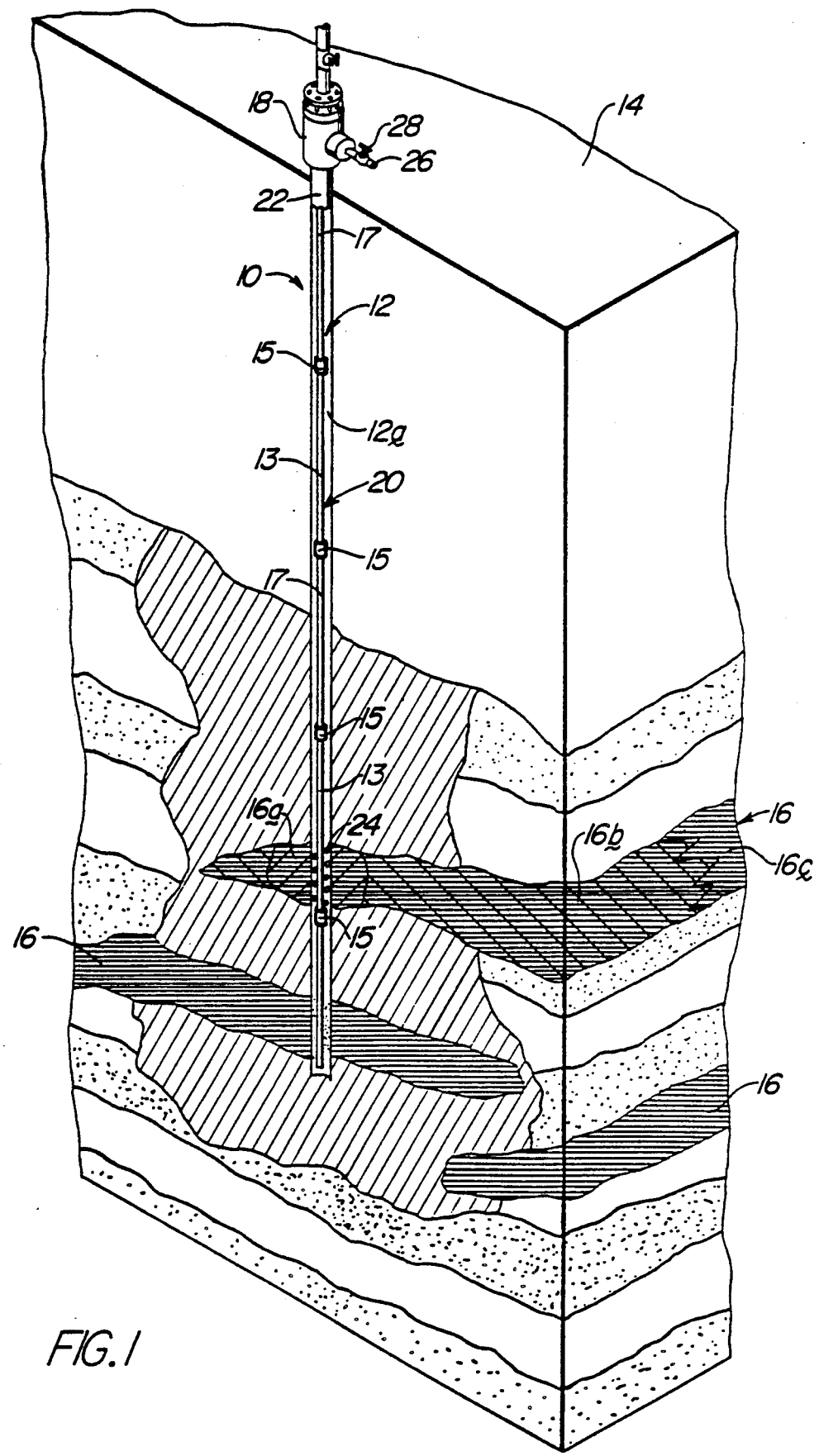
FIG. 1 is an elevational, perspective view of a typical oil or gas well extending down through a geological formation.
Figure 2:
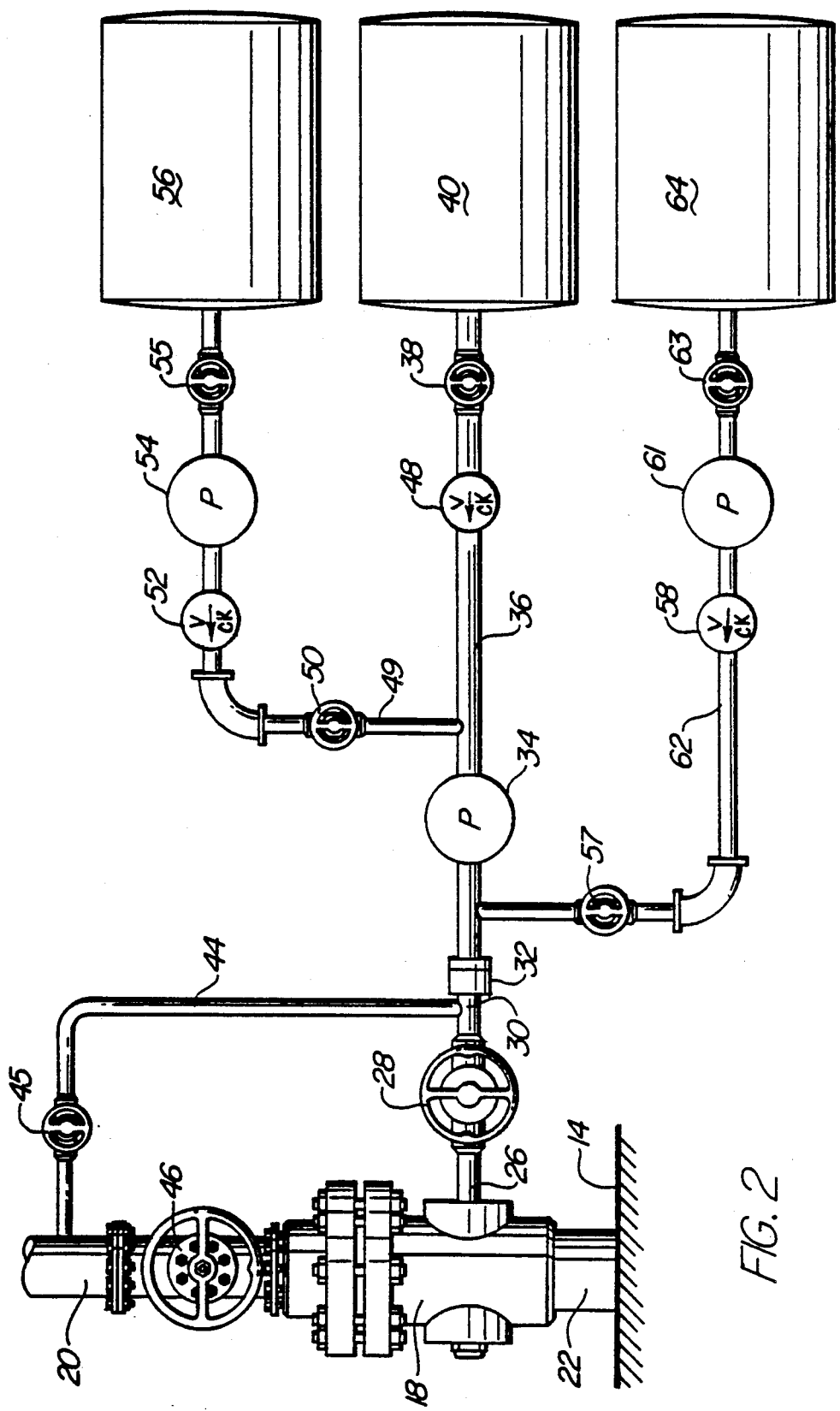
FIG. 2 is a diagrammatic view of apparatus to inject a carrier stream of $CO_2$ into the well and to inject a desiccant and an anhydrous acid into a carrier stream.

As will be hereinafter more fully explained, apparatus to perform a method of stimulating production of hydrocarbons from strata 16 around a well is illustrated in FIGS. 1 and 2 of the drawing. A desiccant removes water from walls of a tubing string in the well and from an area in the strata 16 around the well to form a dehydrated zone 16a. Anhydrous acidic material such as carbon dioxide ($CO_2$), hydrogen chloride (HCl), or hydrogen fluoride (HF) is delivered through the dehydrated zone 16a to mix with connate water in the strata 16 around the dehydrated zone 16a to form a water solution of the acidic material which is reactive with material in the strata. The acid solution is isolated from the tubing string for a period of time allowing the acid to become spent before it is allowed to flow back through the dehydrated zone 16a to the well.

The method of stimulating production from hydrocarbon bearing strata 16 around a well is accomplished by delivering carbon dioxide, nitrogen or other gases to a line communicating with a tubing string which extends into the well in sufficient volume to purge water from the well bore. A desiccant is then injected into the tubing string in a sufficient volume for absorbing water 17b and 17c from walls of the tubing string. A mixture of an anhydrous carrier such as $CO_2$, nitrogen or other gas mixed with an anhydrous acid forming material, such as $CO_2$, HCl or HF, formulated to be a vapor at bottom hole temperature in the hydrocarbon bearing strata 16 is injected into the well at a pressure sufficient to cause the gaseous material to permeate the hydrocarbon bearing strata around the well 10 and to react with connate water to form an acid to etch the matrix to increase permeability of the strata.

Figure 3:
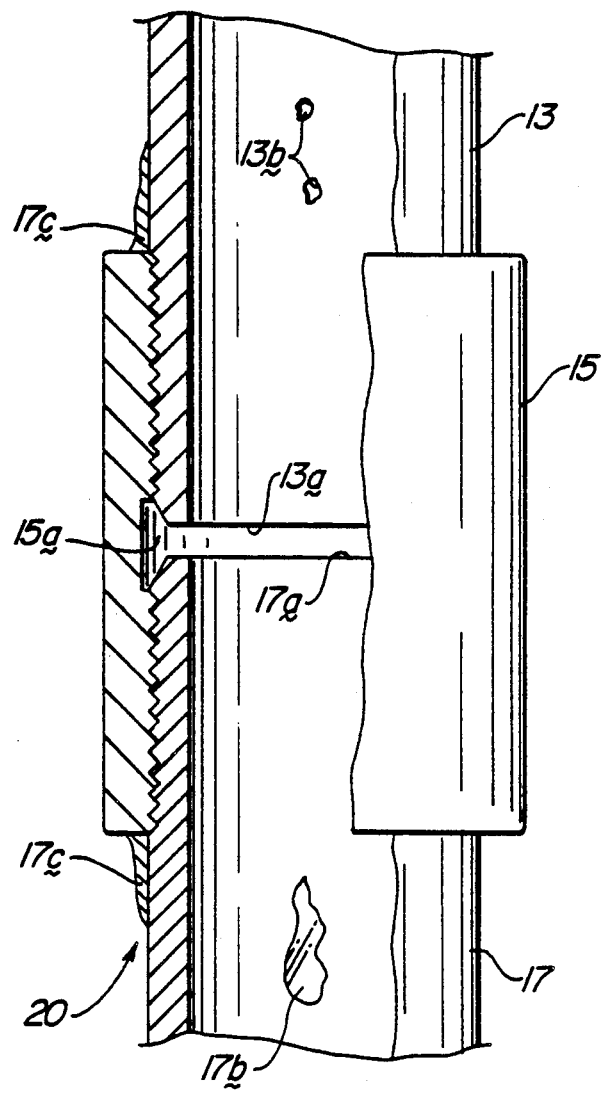
FIG. 3 is a fragmentary cross-sectional view of a a joint in a tubing string.

In FIG. 1, of the drawing, the numeral 10 generally designates an oil well having a bore 12 which extends from the surface 14 of the earth through several geological formations including strata 16 bearing hydrocarbon including oil or gas. Well 10 includes a well head 18 connected to production tubing 20 and casing 22 which has perforations 24 permitting the oil or gas to drain from strata 16 into the bottom of the well bore 12 for transportation upward therefrom through production tubing 20 to well head 18. Tubing string 20 typically comprises a plurality of thirty foot joints 13 and 17 of pipe having ends connected by collars 15, as illustrated in FIG. 3 of the drawing, to form a string 20 of production tubing.

Collar 15 is of conventional design and comprises a cylindrical internally threaded member having an upper end which screws onto the externally threaded lower end of pipe joint 13 and an internally threaded lower end which screws onto the externally threaded upper end of pipe joint 17. Collar 15 may be integrally formed on the end of pipe joint 17 such that pipe joint 17 has an internally threaded bell end while pipe joint 13 has an externally threaded lower pin end which is threadedly received in bell end of joint 17.

Liquid materials containing water tend to collect in space 15a between ends 13a and 17a of pipe joints 13 and 17. The inside wall of joint 13 often has pits 13b formed therein in which moisture may accumulate. Further, thin films 17b and 17c of moisture may cover a portion of inner and outer walls of the tubing string 20 between upper and lower ends thereof.

Casing string 22 is similarly constructed of joints of pipe connected end to end, tubing string 20 extending therethrough forming an annulus 12a between the inner wall of casing 22 and the outer wall of tubing string 20. Liquid containing water may be captured in crevices, grooves or other recesses formed in inner or outer walls of tubing string 20 or casing 22 and a volume of standing water or other liquids may be present adjacent perforations 24 formed in casing 22.

As shown in FIG. 2, apparatus is provided for purging water from the well, dehydrating the tubing and casing, and injecting anhydrous acid forming materials. Pressurized tanks 40, 64 and 56 contain anhydrous materials used for performing the improved method for stimulating a well. However, it should be appreciated that additional tanks and materials may be employed depending upon the particular well and formation to be treated.

The well 10 illustrated in FIG. 1 of the drawing may have, for example, a depth of 5,000 feet extending into a formation of dolomite having a zone height of ten feet, a bottom hole temperature of 110° F., a porosity of 10% containing 45% Sw. Dolomite is a carbonate of calcium and magnesium of the composition $CaCO_3$ $MgCO_3$, differentiated from limestone by having a minimum of 45% $MgCO_2$. It occurs widely distributed in coarse, granular masses or in fine-grained compact form known as pearl spar.

A typical casing 22 has an outside diameter of $5\frac{1}{2}$ inches while tubing string 20 has an outside diameter of $2\frac{7}{8}$ inches. The volume of tubing string 20 is, for example, 28.95 barrels while the volume of the annulus 12a is, for example, 79 barrels.

Referring to FIG. 2 of the drawing, tank 40 contains an anhydrous carrier material such as liquid carbon dioxide ($CO_2$) or nitrogen ($N_2$) which is also used for purging the well of water or other contaminants and flushing the tubing 20 or the annulus 12a following treatment of the well and before the well is shut-in for isolating the acid solution from the tubing string 20 and casing 22 for sufficient time for the acid to become spent, as will be hereinafter more fully explained.

Tank 56 is a source of a suitable acid forming material, such as anhydrous hydrogen chloride gas (HCl), anhydrous hydrogen fluoride (HF), or anhydrous carbon dioxide ($CO_2$). The particular acid forming material may vary depending upon the composition of materials forming the oil or gas bearing strata 16. If the formation is sandstone, HF is preferable unless the cementing material is carbonate; while $CO_2$ is preferable for acidizing a formation of dolomite and HCl for limestone formation.

Anhydrous hydrogen chloride gas is available in steel cylinders under a pressure of 1,000 psi and having a boiling point of 85.03° C.

Hydrochloric acid is a water solution of hydrogen chloride, HCl, and is a colorless or yellowish fuming liquid, with pungent, poisonous fumes. The specific gravity of the gas is 1.269, the solidifying point minus 112° C., and boiling point minus 83° C. It is made by the action of sulfuric acid on sodium chloride. The commercial acid is usually 20° Be equalling 31.45% HCl gas, and has a specific gravity of 1.16.

Fluorine (F) is the most reactive element and one of the strongest oxidizing agents known. Hydrogen fluoride (HF) is the most stable of the hydrogen halides. In the anhydrous state, liquid hydrogen fluoride is an extremely strong acid which reacts only with alkali metals, alkaline earth metals and with thallium.

Hydrofluoric acid is a water solution of hydrogen fluoride, HF. It is a colorless, fuming liquid, highly corrosive and caustic. It dissolves most metals except gold and platinum, and also glass, stoneware and organic material. For commercial applications, hydrofluoric acid is widely used for etching glass, cleaning metals and for dissolving sand from castings.

Tank 64 preferably contains a desiccant, such as alcohol or acetone which will be used for "drying" inner and outer surfaces of tubing string 20, casing 22 and a zone 16a having a radius of, for example, five feet outwardly from the lower end of the well in strata 16 of the production zone.

Chemical desiccants absorb moisture. Chemical dehydration involves removal of water from a substance or system in correct proportion, for a chemical compound or compounds. In the dehydration of alcohol the elements water may be removed from a single molecule or from more than one molecule to yield ethylene by loss of elements of water from each molecule or ethyl ether by loss of elements of water from two molecules.

As illustrated in FIG. 2 of the drawing, tanks 40, 64 and 56 have valves 38, 63 and 55, respectively mounted at the outlet thereof and are preferably vehicular mounted to faciliate delivery of materials to the well site.

Each of the vehicular mounted tanks 40, 64 and 56 preferably is provided with a constant displacement transfer pump 34, 61 and 54, respectively which are operated independently by separate variable speed motors for controlling the proportion of the contents of tanks 40, 64 and 56 to be injected into the well and the sequence at which the various materials are injected.

A first pipe 26 has a valve 28 mounted therewith to control fluid communication into the annulus of the well bore 12 formed between production tubing 20 and casing 22. A second pipe 30 is mounted with valve 28 and outlet end 32 of mixing pump 34. The inlet end 36 of mixing pump 34 is coupled through a check valve 48 to a valve 38 mounted in fluid communication with moveable tank 40 which is a source of liquid $CO_2$, liquid $N_2$ or other suitable anhydrous carrier material.

An inverted L-shaped pipe 44, having a valve 45 mounted therewith to control the passage of fluid therethrough, is connected to second pipe 30 and production tubing 20. Between the pump inlet 36 and the valve 38, a check valve 48 is mounted to prevent flow back to tank 40.

A pipe 62 is mounted with valve 57 and check valve 58 onto pump outlet 30 to control passage of materials therethrough and from pump 61 mounted with valve 63 to moveable tank 64 which supports the desiccant material.

A flow line 49, having a valve 50, check valve 52, transfer pump 54 and valve 55 mounted therein extends between tank 56 of anhydrous acids and pump inlet 36 and communicates with the interior of production tubing 20 through pipe 44 and the annulus 12a through pipe 26.

As will be hereinafter more fully explained, pipe 49 through which anhydrous acid forming material is delivered by transfer pump 54 from tank 56 is connected to the suction side of mixing pump 34 to facilitate injection of anhydrous acid forming material into a stream of carbon dioxide or nitrogen flowing through pipe 36 from tank 40. The anhydrous acid forming material from tank 56 is mixed with the carrier material from tank 40 which moves through mixing pump 34 for injection into the tubing string 20 or the annulus 12a. It should be appreciated that valves 38 and 55 may be opened or closed independently to permit injection of either carrier material from tank 40 or anhydrous acid forming material from tank 56 into well 10, either separately or in combination.

Transfer line 62 from tank 64 containing desiccant material is preferably connected to the outlet side of mixing pump 34 since a volume of desiccant may be injected either before or after a volume of material from tanks 40 and 56 is delivered to pipe 30 for injection into either the interior of the production tubing 20, the annulus 12a or into both the production tubing 20 and the annulus 12a simultaneously.

In operation, valves 45, 50 and 57 are closed and valves 28 and 38 opened. Pump 34 is then activated for injecting $CO_2$ or $N_2$ from tank 40 down the annulus 12a of well bore 12, which carries the $CO_2$ down casing 22 to the bottom of well bore 12. Valve 46 is then opened to permit passage of the $CO_2$ up production tubing 20 and thereby removes liquid, scale and other impurities from the bottom of the well bore.

The volume of anhydrous material delivered from tank 40 for purging and flushing out the tubing string and the annulus 12a depends upon the depth of the well and the combined volume of production tubing 20 and the annulus 12a. However, for a well having a depth of 5,000 feet, tubing having a volume of approximately 30 barrels and an annulus having a volume of approximately 80 barrels, a total volume of at least 110 barrels of material would preferably be circulated rather quickly through the tubulars for purging the annulus and the tubing string of the well.

As hereinbefore described and illustrated in FIG. 3 of the drawing, moisture tends to collect in grooves and crevices in surfaces of tubing string 20 and casing 22. To prevent reaction between the acidizing agents which will flow through the tubing string 20 or the annulus 12a, valves 57 and 63 are opened and pump 61 is energized for delivering a volume of, for example, 600 gallons of alcohol through pipes 26 and 44 into the annulus 12a and the interior of tubing string 20. The desiccant moving through the tubulars absorbs moistures thereby drying or dehydrating surfaces of the tubulars. The desiccant material flows to the bottom of the well.

The following is a typical well treatment design:
dolomite formation 5700' depth
10' net pay thickness
porosity 10%
$S_w$ 45%
oil grav. 35° API
BHT 110°
BHP 600 psi
5½" csq., 2⅜" tbg.
$CO_2$ solubility in water–95 cu. ft. per bbl.
$CO_2$ solubility in oil–400 cu. ft. per bbl.

Job design called for 100′ CO2 penetr. and at least 57′ acid penetr. Assuming a homogenous reservoir and that penetration will be essentially horizontal in nature. Job requirments were for 600 gal. desiccant, 85 tons CO2, and 11,300 lb HCl, (equiv. to 10,000 gal. 15% HCl)

Pumping schedule:
displace hole with 28 tons
pump 5 ton pad
pump 22 tons CO2 plus 25% HCl by weight
displace with 20 tons From the foregoing it should be readily apparent that at this point water and other impurities have been purged from the well and moisture has been removed from surfaces of the tubulars 20 and 22.

Immediately following or simultaneously with the delivery of the desiccant from tank 64 into the well, valve 38 is opened and pump 34 is energized for delivering a sufficient volume of carbon dioxide or nitrogen into the well for causing the desiccant to flow through perforations 24 into the hydrocarbon bearing strata 16 to absorb moisture in a radius of, for example, five feet around the well bore 12 for forming a dehydrated zone 16a adjacent the outside of casing 22.

Valves 57 and 63 are then closed to terminate further transfer of desiccant from tank 64 through pump 61 and valves 50 and 55 are opened to permit anhydrous acid forming material to be transferred through pump 54 from tank 56 into the stream of carrier material moving through pipe 36 from tank 40. The CO2 may then be pumped down either or both the annulus 12a of the well bore 12 or production tubing 20 to the bottom of the well bore. During this process, a predetermined amount of the anhydrous acid is injected into the CO2 stream by opening valves 50 and 55, and activating pump 54 to permit withdrawal of the anhydrous acid from tank 56. Sufficient CO2 is injected down the well to provide a pressure enabling the gaseous CO2, formed by the vaporization of the liquid CO2, and the anhydrous acids to permeate through strata 16 and react (mix) with connate water, making carbonic acid and reactive HCl and/or HF.

When sufficient CO2 and acid have been added, valves 28 and 46 are closed to shut in the well for a period of time enabling the acid solution to react with the rocks in the strata and thereby increase the permeability of the strata, which in turn stimulates the production of oil and/or gas out of the strata. Since the reaction time of the carbonic acid is relatively slow, it may penetrate more deeply into the strata before spending itself. Additionally, the HCl reacts more slowly in the presence of great excesses of CO2, permitting deeper penetration of this acid also.

Since well logging techniques and core analysis permit the quantity of connate water contained within the strata to be determined, it is possible to determine the quantities of CO2 and acid necessary to be injected into the well to enable formation of the acid solution a selected distance outwardly from the bottom of the well. Likewise, the amount of anhydrous acid is determined to enhance the overall stimulation effect. Accordingly, a quantity of the CO2 and anhydrous acid is chosen for injection into the well sufficient to form reactive acid a preselected distance from the well bottom in zone 16b illustrated in FIG. 1 of the drawing around the dehydrated zone 16a.

The invention having been described, what is claimed is:

1. A method of stimulating production from a well having a production tubing extending through a casing comprising the steps of: dehydrating surfaces of the production tubing and casing in the well and the strata in an area around the well; injecting an admixture of an anhydrous acid forming agent and CO2 into the well to permeate through the strata around the well and to dissolve in connate water a preselected distance from the well to form an acidic solution in the strata away from the casing to prevent excessive precipitation of dissolved solids in the strata adjacent the well; and shutting in the well for a period of time sufficient to enable substantially total reaction of the acidic solution with rocks in the strata and thereby stimulate production from the well.

2. The method of claim 1, with the addition of the step of injecting a quantity of CO2 into the well which is sufficient to cause the acid forming agent to permeate the strata such that the acidic solution is formed a predetermined distance from the bottom of the well.

3. The method of claim 2, wherein the step of injecting an anhydrous acid forming agent comprises the step of: injecting a volume of anhydrous HCl into the CO2 to be carrie din the CO2 stream into the well.

4. The method of claim 1, the step of injecting an anhydrous acid forming agent comprises the step of: delivering the anhydrous acid forming agent down the production tubing of the well.

5. The method of claim 1, the step of injecting an anhydrous acid forming agent comprises the step of: delivering the anhydrous acid forming agent down the annulus formed between the production tubing and casing of the well.

6. The method of claim 1, the step of injecting an anhydrous acid forming agent comprises the step of: delivering the anhydrous acid forming agent down the production tubing and down the annulus formed between the production tubing and casing of the well.

7. A method of stimulating production from strata around a well comprising the steps of: delivering a desiccant to remove water from walls of a tubing string and casing in a well and from an area in the strata around the well to form a dehydrated zone; delivering an anhydrous mixture of CO2 and a hydrogen halide containing a great excess of CO2 through the dehydrated zone to mix with connate water in the strata around the dehydrated zone to form an acid solution a preselected distance from the well which is reactive with material in the strata; and isolating the acid solution from the tubing string for a period of time.

8. The method of claim 7, wherein the desiccant comprises: alcohol.

9. The method of claim 7, wherein the anhydrous hydrogen halide comprises: hydrogen chloride.

10. The method of claim 7, wherein the anhydrous hydrogen halide comprises: anhydrous hydrogen chloride gas.

11. The method of claim 7, wherein the anhydrous hydrogen halide comprises: hydrogen fluoride.

12. A method of stimulating production from strata around a well comprising the steps of: delivering carbon dioxide to a line communicating with the well in sufficient volume to circulate water and contaminants upwardly from the well bore to clean and cool the well bore; injecting a desiccant into the well in a sufficient volume to dehydrate the well and the strata in an area around the well; injecting a mixture of an anhydrous carrier mixed with an anhydrous acid forming material formulated to vaporize at a temperature greater than that of the strata at a pressure sufficient to cause the gaseous material to permeate the strata around the well to react with connate water, said mixture containing a sufficient excess of carrier material to prevent immediate reaction of the acid forming material with the connate water; and injecting a sufficient volume of $CO_2$ to transport the anhydrous acid vapor a predetermined distance through the strata from the well.

13. The method of claim 12, wherein the desiccant comprises: alcohol and the acid forming material comprises hydrogen chloride.

14. A method of stimulating production from a well having a casing comprising the steps of: purging water from the well; injecting a volume of anhydrous HF into a stream of $CO_2$ to form an anhydrous acid forming agent; injecting the anhydrous acid forming agent into the well to permeate through the strata around the well and to dissolve in connate water to form an acidic solution in the strata around the casing; injecting a quantity of $CO_2$ into the well which is sufficient to cause the acid forming agent to permeate the strata such that the acidic solution is formed a predetermined distance from the bottom of the well; and shutting in the well for a period of time sufficient to enable substantially total reaction of the acidic solution with rocks in the strata and thereby stimulate production from the well.

15. The method of claim 14 the step of purging water from the well comprising the step of: injecting $CO_2$ into the well at sufficient pressure to cause water to flow out of the well; and injecting a desiccant into the well to absorb moisture from surfaces of the production tubing and the casing in the well.

16. The method of claim 14, the step of purging water from the well comprising the steps of: injecting a desiccant down the production tubing and down the annulus formed between the production tubing and casing of the well to remove moisture from the tubing and casing; and injecting $CO_2$ into the well to cause desiccant to flow from the well into the strata adjacent the well to assure a water-free environment for passage of the anhydrous acid forming agent through the well.

17. The method of claim 14, the step of purging water from the well comprising: delivering pressurized nitrogen gas into the well at sufficient pressure for causing water to flow from the well into the strata.

18. The method of claim 14, wherein said anhydrous acid forming agent is injected into the well by entrainment with gas.

19. The method of claim 18, wherein said gas is a gas inert with respect to said acid forming agent.

20. The method of claim 18, wherein said gas is carbon dioxide.

21. The method of claim 18, wherein said gas is nitrogen.

22. The method of claim 18, wherein said gas is a mixture of gases inert with respect to said acid forming agent.

23. A method of stimulating production from strata around a well comprising the steps of: delivering a desiccant to remove water from walls of a tubing string and casing in a well and from an area in the strata around the well to form a dehydrated zone; delivering a volume of anhydrous carbon dioxide mixed with a volume of anhydrous hydrogen fluoride through the dehydrated zone to mix with connate water in the strata around the dehydrated zone to form an acid solution which is reactive with material in the strata; and isolating the acid solution from the tubing string for a period of time.

24. A method of stimulating production from strata around a well comprising the steps of: delivering carbon dioxide to a line communicating with the well in sufficient volume to remove water from the well bore; injecting alcohol into the well in a sufficient volume for absorbing water from surfaces in the well; injecting a mixture of an anhydrous carrier mixed with anhydrous hydrogen fluoride formulated to vaporize at a temperature greater than that of the strata at a pressure sufficient to cause the gaseous material to permeate the strata around the well to react with connate water; and injecting a sufficient volume of $CO_2$ to transport the anhydrous acid vapor a predetermined distance through the strata from the well.

* * * * *